United States Patent
Kitamura

(10) Patent No.: US 9,336,458 B2
(45) Date of Patent: May 10, 2016

(54) IMAGE PROCESSING DEVICE, METHOD AND PROGRAM

(71) Applicant: Fujifilm Corporation, Tokyo (JP)

(72) Inventor: Yoshiro Kitamura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/542,418

(22) Filed: Nov. 14, 2014

(65) Prior Publication Data

US 2015/0071553 A1 Mar. 12, 2015

Related U.S. Application Data

(63) Continuation of application No. 13/626,503, filed on Sep. 25, 2012, now Pat. No. 8,897,576.

(30) Foreign Application Priority Data

Sep. 26, 2011 (JP) .................................. 2011-209246

(51) Int. Cl.
  *G06K 9/62* (2006.01)
  *G06T 7/00* (2006.01)
(52) U.S. Cl.
  CPC ............ *G06K 9/6211* (2013.01); *G06T 7/0089* (2013.01); *G06T 7/0093* (2013.01); *G06K 2209/051* (2013.01); *G06T 2207/20072* (2013.01); *G06T 2207/20164* (2013.01); *G06T 2207/30101* (2013.01); *G06T 2207/30172* (2013.01)
(58) Field of Classification Search
  None
  See application file for complete search history.

(56) References Cited

U.S. PATENT DOCUMENTS

| 2005/0267657 | A1* | 12/2005 | Devdhar | G06K 9/00208 701/33.4 |
| 2007/0269111 | A1* | 11/2007 | Bolin | G06K 9/00281 382/195 |
| 2010/0259546 | A1* | 10/2010 | Yomdin | G06T 7/0083 345/473 |
| 2011/0026785 | A1* | 2/2011 | Dewaele et al. | 382/128 |
| 2011/0085701 | A1 | 4/2011 | Kitamura | |

FOREIGN PATENT DOCUMENTS

EP  2 309 424 A2  4/2011

OTHER PUBLICATIONS

Torresani et al, "Feature correspondence via graph matching: Models and global optimization," 2008, Computer Vision—ECCV 2008, pp. 1-24.*
Torresani, et al., "Feature Correspondence Via Graph Matching: Models and Global Optimization", 2008, Computer Vision—ECCV 2008, pp. 1-24.
Extended European Search Report dated Sep. 17, 2014.

(Continued)

*Primary Examiner* — David F Dunphy
(74) *Attorney, Agent, or Firm* — McGinn IP Law Group, PLLC

(57) ABSTRACT

An image processing device includes a candidate point extracting unit configured to extract a plurality of candidate points belonging to a predetermined structure from image data, a shape model storing unit configured to store a shape model representing a known shape of the predetermined structure, the shape model being formed by a plurality of model labels having a predetermined connection relationship, and a corresponding point selecting unit configured to select a mapping relationship between the candidate points and the model labels from a set of candidate mapping relationships.

17 Claims, 9 Drawing Sheets

(56) References Cited

OTHER PUBLICATIONS

Yoshiro Kitamura, et al., "Automatic Coronary Extraction by Supervised Detection and Shape Matching", Imaging Technology Center, IEEE, May 2, 2012, pp. 234-237.

Wikipedia: "Lagrange Multiplier", Sep. 4, 2014, http://wikipedia.org/wiki/lagrange_multiplier.
European Office Action dated Jul. 13, 2015.
European Office Action dated Feb. 4, 2016.

* cited by examiner

FIG.6
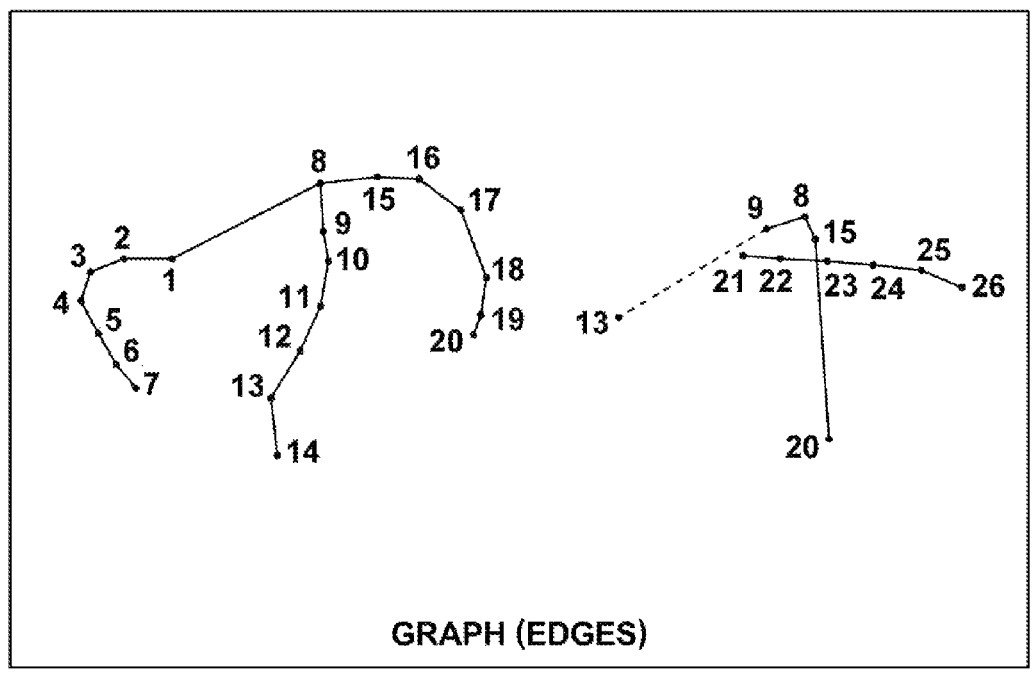
GRAPH (EDGES)
FIG.7
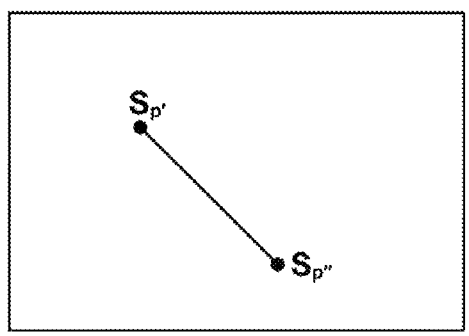
CORRESPONDING POINT SELECTING MEANS 40
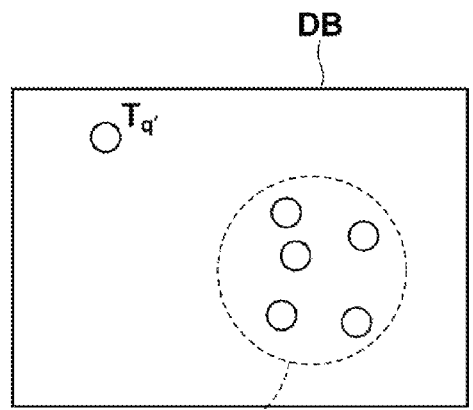
DB
RELATIVE DISTRIBUTION OF $T_q''$

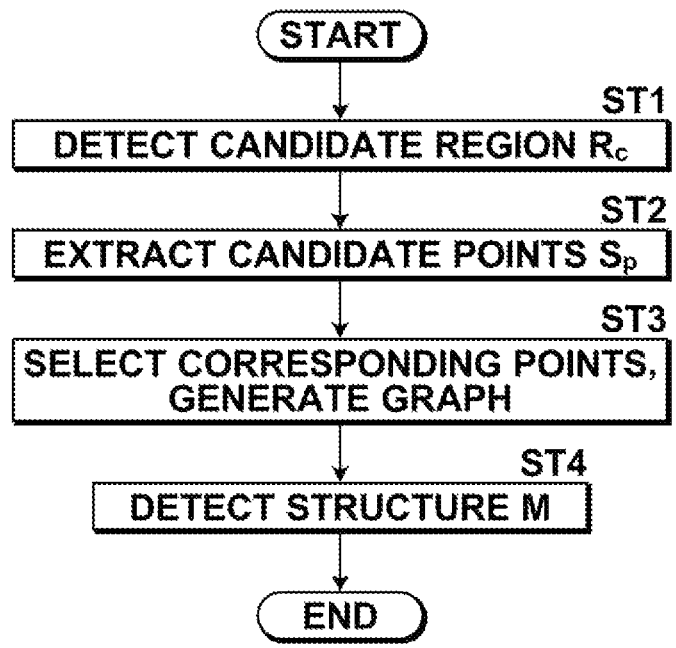

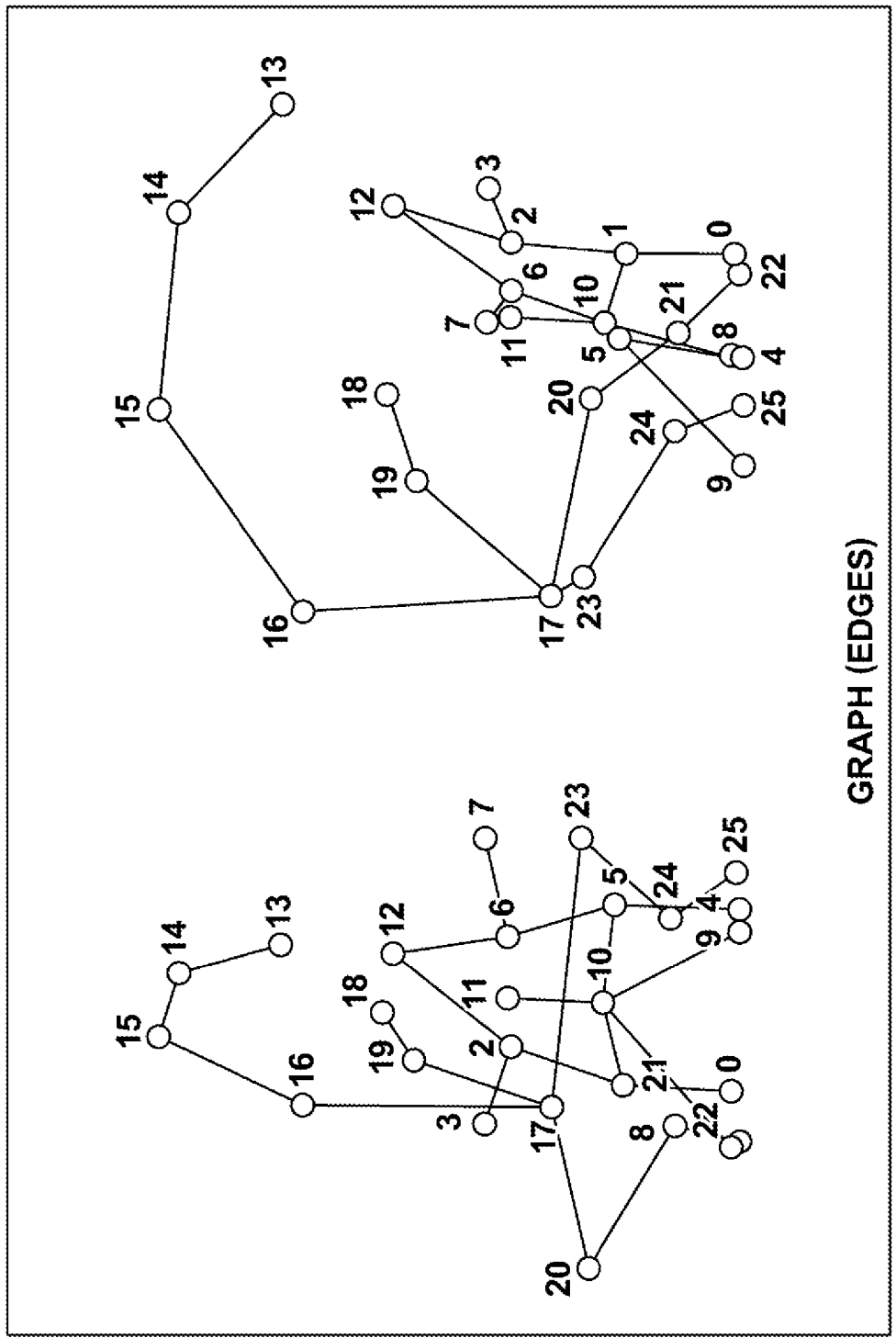
FIG.10  GRAPH (EDGES)

IMAGE PROCESSING DEVICE, METHOD AND PROGRAM

RELATED APPLICATIONS

This application is a Continuation Application of U.S. patent application Ser. No. 13/626,503, filed on Sep. 25, 2012, which, in turn, claims priority to Japanese Patent Application 2011-209246, filed on Sep. 26, 2011.

BACKGROUND OF THE INVENTION

1. Field of the Invention

The present invention relates to an image processing device, an image processing method and an image processing program for extracting a plurality of candidate points belonging to a predetermined structure from image data and performing matching between the candidate points and nodes of a known shape model which represents a shape of the predetermined structure.

2. Description of the Related Art

Automatic extraction of a structure, such as coronary arteries, from three-dimensional image data, such as volume data, has conventionally been conducted (see, for example, U.S. Patent Application Publication No. 20110085701, which will hereinafter be referred to as Patent Document 1). Patent Document 1 discloses extracting a plurality of candidate points forming coronary arteries based on values of voxel data forming volume data, selecting, from the extracted candidate points, a corresponding point corresponding to each model label forming a shape model such that the corresponding points form a graph structure that is most similar to the shape model, and determining paths connecting the selected corresponding points by selectively connecting the candidate points to achieve a minimal cost based on a predetermined index value.

The selection of the corresponding points is achieved by providing an evaluation function for evaluating a similarity between the graph structure formed by the set of candidate points corresponding to the model labels and the shape model, and finding an optimal solution (a mapping between the candidate points and the model labels) of the evaluation function. In this case, a set C of feasible solutions x of the evaluation function is usually defined as Equation (1) below:

$$C = \left\{ x \in \{0,1\}^{P \times Q} \,\middle|\, \sum_{Sp \in P} xSpTq \leq 1, \right.$$

$$\left. \sum_{Tq \in Q} xSpTq \leq 1, \forall\, Sp \in P \text{ and } \forall\, Tq \in Q \right\}.$$

where P represents a set of candidate points $S_p$, Q represents a set of model labels $T_q$, $xSpTq$ is a binary variable indicating a mapping relationship between an arbitrary candidate point $S_p$ and an arbitrary model label $T_q$ and has a value of 1 if the candidate point $S_p$ is mapped with the model label $T_q$ or a value of 0 if the candidate point $S_p$ is not mapped with the model label $T_q$, and x is a P×Q-dimensional vector with values of the variable $xSpTq$ being the elements thereof.

In Equation (1), the constraints limiting the feasible solutions x are formed by two inequality expressions. The inequality expression on the left means that a sum of values of the variable $xSpTq$ obtained between an arbitrary model label $T_q$ and each candidate point $S_p$ belonging to the set P is not more than 1. This means that each model label is mapped with only one of the candidate points or none of the candidate points. The inequality expression on the right means that a sum of values of the variable $xSpTq$ obtained between an arbitrary candidate point $S_p$ and each model label $T_q$ belonging to the set Q is not more than 1. This means that each candidate point is mapped with only one of the model labels or none of the model labels.

However, with the above-described conventional method, where the set of candidate points to be mapped with the model labels is selected from the feasible solutions x belonging to the set C, the selection of the candidate points to be mapped with the model labels as the optimal solution of the evaluation function may be inappropriate, and this is problematic.

For example, as shown in FIG. 11A, when a plurality of candidate points $S_{11}$ to $S_{19}$ have been extracted from image data, the candidate points $S_{11}$, $S_{15}$, $S_{17}$ and $S_{19}$ may be selected as the corresponding points forming a graph structure that matches or is most similar to a shape model $M_{ref}1$ formed by model labels $T_{11}$ to $T_{14}$, and a graph structure $M_s1$ may be formed by connecting the corresponding points. However, in the graph structure $M_s1$, the candidate point selected to be mapped with the model label $T_{12}$, which is located at the branch point of the structure, is inappropriate, resulting in partially overlapped paths connecting the corresponding points. In this case, it is desired to form a graph structure $M_s1'$, as shown in FIG. 11B, as an appropriate mapping.

Further, as shown in FIG. 12A, for example, when a plurality of candidate points $S_{21}$ to $S_{27}$ have been extracted from image data, the candidate points $S_{21}$, $S_{26}$ and $S_{27}$ may be selected as the corresponding points forming a graph structure that matches or is most similar to a shape model $M_{ref}2$ formed by model labels $T_{21}$ to $T_{23}$, and a graph structure $M_s2$ may be formed by connecting the corresponding points. However, in the graph structure $M_s2$, the candidate point selected to be mapped with the model label $T_{21}$, which is located at a branch point of the structure, is inappropriate, resulting in overlapped paths connecting the corresponding points. In this case, it is desired to form a graph structure $M_s2'$, as shown in FIG. 12B, as an appropriate mapping.

SUMMARY OF THE INVENTION

In view of the above-described circumstances, the present invention is directed to providing an image processing device, an image processing method and an image processing program that can achieve more accurate mapping between candidate points extracted from image data and nodes of a shape model.

An aspect of the image processing device of the invention includes: candidate point extracting means for extracting a plurality of candidate points belonging to a predetermined structure from image data; shape model storing means storing a shape model representing a known shape of the predetermined structure, the shape model being formed by a plurality of model labels having a predetermined connection relationship; and corresponding point selecting means for selecting corresponding points corresponding to the model labels from the candidate points extracted by the candidate point extracting means under constraints (a) to (c) below: (a) each model label is mapped with only one of the candidate points or none of the candidate points; (b) each candidate point is mapped with only one of the model labels or none of the model labels; and (c) when a path between two candidate points which are mapped with each pair of the model labels connected with each other is determined, each candidate point which is mapped with none of the model labels is included in only one of the determined paths or none of the determined paths.

An aspect of the image processing method of the invention includes the steps of: extracting a plurality of candidate points belonging to a predetermined structure from image data; obtaining a shape model stored in advance in shape model storing means, the shape model representing a known shape of the predetermined structure and being formed by a plurality of model labels having a predetermined connection relationship; and selecting corresponding points corresponding to the model labels from the extracted candidate points under constraints (a) to (c) below: (a) each model label is mapped with only one of the candidate points or none of the candidate points; (b) each candidate point is mapped with only one of the model labels or none of the model labels; and (c) when a path between two candidate points which are mapped with each pair of the model labels connected with each other is determined, each candidate point which is mapped with none of the model labels is included in only one of the determined paths or none of the determined paths.

An aspect of the image processing program of the invention is a program for causing at least one computer to carry out the above-described image processing method. This program is recorded on a recording medium, such as a CD-ROM or DVD, or in a storage of a server computer or a network storage in a downloadable state to be delivered to the user.

The predetermined structure herein may be any object that can be represented by a graph structure formed by points and lines connecting the points, and may include, in particular, a tubular structure of a human body, such as the trachea, the intestines, the coronary arteries, the cerebral vessels, the pulmonary vessels, the hepatic vessels or the bronchial tubes, or a person's face.

The image data herein may be medical image data taken, for example, with a CT device, MR device, ultrasonic device, PET-CT device, SPECT device, 4D-CT device, OCT device or X-ray imaging device (CR, DR), three-dimensional image data, such as volume data, or image data taken with a digital camera, etc.

The shape model herein represents a known shape of a predetermined structure, or, in other words, a shape to be detected of the predetermined structure. For example, the shape model represents a typical anatomical shape of the predetermined structure, or an anatomical shape of the predetermined structure in a normal state.

The paths in the constraint (c) can be determined by selectively connecting the candidate points such that a minimal cost based on a predetermined index value is achieved.

In the image processing device, method and program of the invention, when a set of the candidate points is represented by P, a set of the model labels is represented by Q, and a mapping relationship between the candidate points and the model labels is represented by a vector x having P×Q elements, the corresponding points may be selected by selecting the mapping relationship from a set C of candidate solutions satisfying a constraint expressed by Equation (2) below:

$$C = \left\{ x \in \{0,1\}^{P \times Q} \middle| \sum_{Sp \in P} xSpTq \leq 1, \sum_{Tq \in Q} xSpTq \leq 1, \right. \quad (2),$$

$$\left. \sum_{(Sp',Sp'') \in P \times P | Sp' < Sp''} \left( ySpSp'Sp'' \times \sum_{Tq \in Q} xSp'Tq \times \sum_{Tq \in Q} xSp''Tq \right) \leq 1, \right.$$

$$\left. \forall p \in P \text{ and } \forall q \in Q \right\}.$$

where $x_{SpTq}$ ($x_{Sp'Tq}$, $x_{Sp''Tq}$) is a binary variable indicating a mapping relationship between an arbitrary candidate point $S_p$ ($S_{p'}$, $S_{p''}$) and an arbitrary model label $T_q$ and has a value of 1 if the candidate point is mapped with the model label or a value of 0 if the candidate point is not mapped with the model label, and $y_{SpSp'Sp''}$ is a binary variable having a value of 1 if the candidate point $S_p$ is included in a path between other two candidate points $S_{p'}$ and $S_{p''}$ belonging to the set P or a value of 0 if the candidate point $S_p$ is not included in the path.

In Equation (2), the constraints limiting the feasible solutions x are formed by two inequality expressions. The left side of the inequality expression on the left means a sum of values of the variable $x_{SpTq}$ obtained between an arbitrary model label $T_q$ and each candidate point $S_p$ belonging to the set P, and the first term of the left side of the inequality expression on the right means a sum of values of the variable $X_{SpTq}$ obtained between an arbitrary candidate point $S_p$ and each model label $T_q$ belonging to the set Q. Further, $\Sigma x_{Sp'Tq}$, which is the second term of the left side of the inequality expression on the right, means a sum of values of the variable $x_{Sp'Tq}$ obtained between the candidate point $S_{p'}$ and each model label $T_q$ belonging to the set Q, and $\Sigma x_{Sp''Tq}$ means a sum of values of the variable $x_{Sp''Tq}$ obtained between the candidate point $S_{p''}$ and each model label $T_q$ belonging to the set Q.

The corresponding points may be selected by minimizing an energy function E expressed by Equation (3) below including the vector x as a variable using a Dual Decomposition method:

$$E(x | \theta) = \sum_{a \in R} \theta_a x_a + \sum_{(a,b) \in R \times R} \theta_{ab} x_a x_b, \quad (3)$$

where a and b represent individual mappings between the candidate points and the model labels in the mapping relationship represented by the vector x, b represents a different mapping from a mapping represented by a, a and b are elements belonging to a set R and the set R is a subset of P×Q, $\theta_a$ represents a cost of a mapping a∈R, and $\theta_{ab}$ represents a cost of (a,b) ΔR×R, which is a combination of the mappings a and b.

The extraction of the candidate points may be achieved by detecting a region having an image feature and/or a structural feature of the predetermined structure from the image data, and extracting the candidate points from the detected region.

The selection of the corresponding points may be achieved by any method as long as the corresponding points that match or are most similar to the shape model are selected from the candidate points. For example, a set of corresponding points forming a graph structure that matches or is most similar to the shape model may be selected using graph matching.

The shape model storing means may store an evaluation function, which is obtained through a learning process using training image data known to represent the predetermined structure and indicates a likelihood of the candidate points representing the shape model. In this case, the selection of the corresponding point is achieved using the evaluation function.

The image processing device of the invention may further include structure detecting means for detecting the predetermined structure from the image data based on the corresponding points selected by the corresponding point selecting means and the determined paths between the corresponding points.

The corresponding point selecting means may determine the paths by selectively connecting the candidate points to achieve a minimal cost based on a predetermined index value.

According to the image processing device, method and program of the invention, a plurality of candidate points belonging to a predetermined structure are extracted from image data, a shape model, which is stored in advance in the shape model storing means, represents a known shape of the predetermined structure and is formed by a plurality of model labels having a predetermined connection relationship, is obtained, and corresponding points corresponding to the model labels are selected from the extracted candidate points under the above-described constraints (a) to (c). Therefore, a mapping between the candidate points and the model labels which has overlapped paths connecting the corresponding points, such as the graph structure $M_s1$ shown in FIG. 11A or the graph structure $M_s2$ shown in FIG. 12A, can be excluded, thereby achieving more accurate mapping between the candidate points extracted from the image data and the model labels (nodes) of the shape model than that achieved by the conventional method.

Further, in the case where the mapping is selected from a set C of candidate solutions satisfying a constraint expressed by Equation (2) described above, a mapping between the candidate points and the model labels which has overlapped paths connecting the corresponding points can be excluded, thereby achieving more accurate mapping between the candidate points extracted from the image data and the model labels of the shape model.

Still further, in the case where the corresponding points are selected by minimizing the energy function E expressed by Equation (3) described above, which includes the vector x as a variable, using a Dual Decomposition method, fast and accurate selection of the corresponding points can be achieved.

Yet further, in the case where the predetermined structure is detected from the image data based on the corresponding points selected as described above and the determined paths between the corresponding points, accurate detection of the predetermined structure from the image data can be achieved.

BRIEF DESCRIPTION OF THE DRAWINGS

FIG. 6 is a schematic diagram illustrating one example of a graph (edges) formed by connecting corresponding points (model labels), FIG. 7 is a schematic diagram illustrating how the corresponding points are select by a corresponding point selecting means, FIG. 8 is a flow chart illustrating the flow of a process to detect a structure by the structure detection device, FIG. 10 is a schematic diagram illustrating one example of a graph (edges) formed by connecting the corresponding points (the model labels)

DESCRIPTION OF THE PREFERRED EMBODIMENTS

Figure 1:
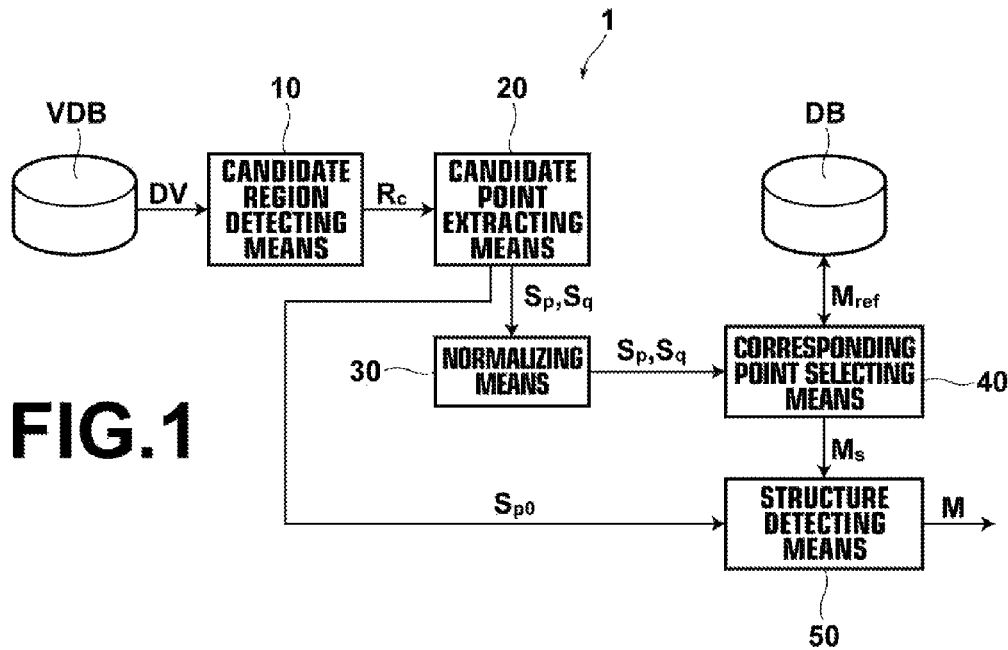
FIG. 1 is a block diagram illustrating the schematic configuration of a structure detection device.

Hereinafter, one embodiment of the present invention will be described with reference to the drawings. FIG. 1 is a block diagram 1 illustrating the schematic configuration of a structure detection device 1. The configuration of the structure detection device 1 as shown in FIG. 1 is implemented by executing, on a computer, a structure detection program, which is read in an auxiliary storage device of the computer. The structure detection program is distributed with being stored in a storage medium, such as a CD-ROM, or via a network, such as the Internet, to be installed on a computer. The structure detection device 1 shown in FIG. 1 detects a structure M, such as coronary arteries, from image data, and includes a candidate region detecting means 10, a candidate point extracting means 20, a normalizing means 30, a corresponding point selecting means 40 and a structure detecting means 50.

The candidate region detecting means 10 detects a candidate region $R_c$ by determining whether or not each pixel in the image data DV forms a part of the predetermined structure M. The image data DV is stored in a data storing means VDB. The image data DV may be formed by a two-dimensional image or three-dimensional volume data generated from a plurality of two-dimensional images taken with an imaging device or a radiation detection device, for example.

Figure 2:
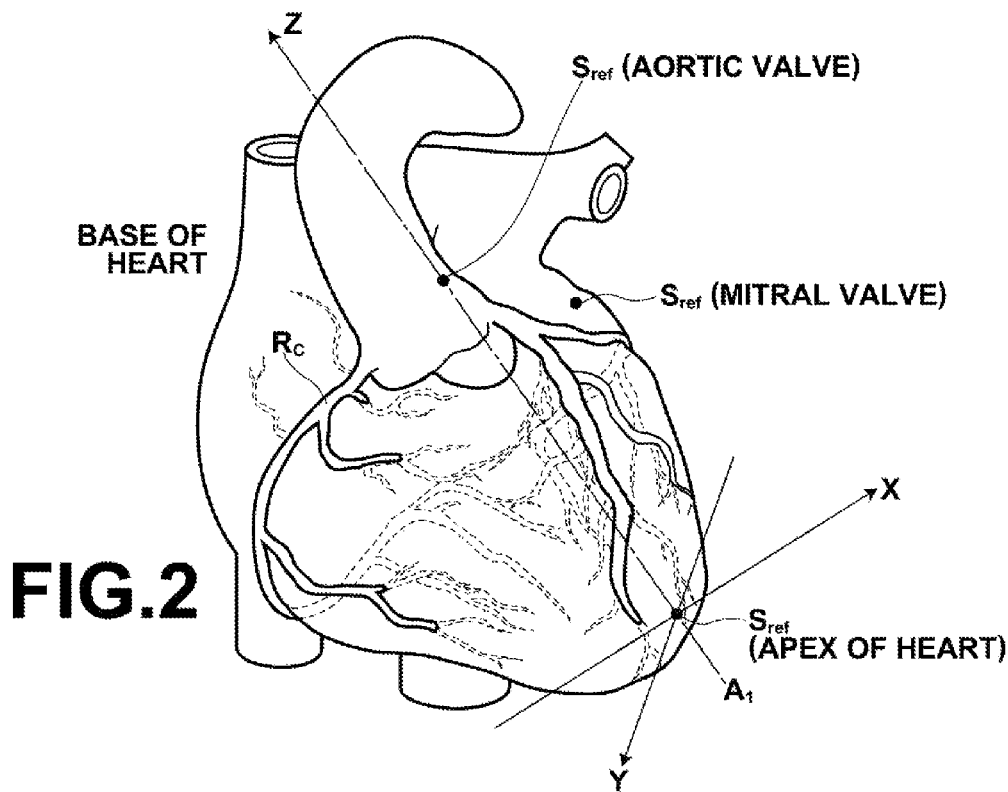
FIG. 2 is a schematic diagram illustrating one example of coronary arteries to be detected as a predetermined structure by a candidate region detecting means.

The candidate region detecting means 10 detects the candidate region using, for example, a technique disclosed in Japanese Patent Application No. 2009-048679 or a technique disclosed in Japanese Patent Application No. 2009-069895, or any other known technique. As one example, a case where the predetermined structure M is the coronary arteries of the heart, as shown in FIG. 2, and the candidate region $R_c$ is detected from volume data is described.

First, the candidate region detecting means 10 calculates positions and major axis directions of candidate points forming central lines of the coronary arteries based on values of the voxel data forming the volume data DV. Alternatively, the candidate region detecting means 10 may calculate a Hessian matrix for the volume data DV, and analyze eigenvalues of the calculated Hessian matrix to calculate positional information and the major axis directions of the candidate points forming the central lines of the coronary arteries. Then, the candidate region detecting means 10 calculates, for voxel data around the candidate points, feature quantities indicating likelihood of the voxel data representing the coronary arteries, and determines whether or not the voxel data represents the coronary artery region based on the calculated feature quantities. The determination based on the feature quantities may be achieved, for example, based on an evaluation function, which is obtained in advance through a machine learning process. With this, image data DV, which is determined to represent the coronary artery region, is extracted as the candidate region $R_c$ from the image data.

Figure 3:
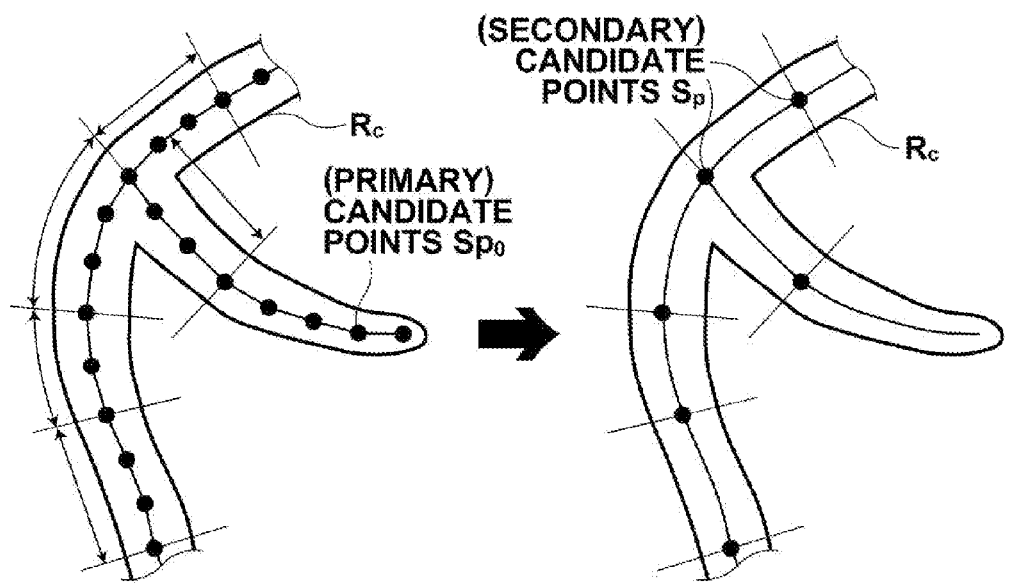
FIG. 3 is a schematic diagram illustrating how candidate points are extracted from a candidate region by a candidate point extracting means.

The candidate point extracting means 20 shown in FIG. 1 extracts a plurality of candidate points $S_p$ (p=1 to n, where n is the number of extracted candidate points) from the candidate region $R_c$ detected by the candidate region detecting means 10. FIG. 3 is a schematic diagram illustrating how the candidate points $S_p$ are extracted from the candidate region $R_c$. As shown in FIG. 3, the candidate point extracting means 20 extracts a plurality of (primary) candidate points $S_{p0}$ from the candidate region $R_c$, and connects the extracted (primary) candidate points $S_{p0}$. For connecting the candidate points, a minimal spanning tree algorithm may be used to connect all the (primary) candidate points $S_{p0}$ at a minimal cost. The cost may be distances between the (primary) candidate points $S_{p0}$, or the like. In a case where the distances between the (primary) candidate points $S_{p0}$ are used as the cost, such a definition may be made that, the larger the distances, the larger the cost. Then, the candidate point extracting means 20 divides the (primary) candidate points $S_{p0}$ per a predetermined length unit (segmentation), and selects the dividing points, where the candidate points are divided, as (secondary) candidate points $S_p$. Then, the candidate point extracting means 20 assigns a label $S_p$ to each (secondary) candidate point. It should be noted that, although the case where the candidate point extracting means 20 selects the (secondary) candidate points $S_p$ from the (primary) candidate points $S_{p0}$ is described as an example, a graph structure $M_s$, which will be described later, may be detected using the (primary) candidate points $S_{p0}$. In this case, the candidate region detecting means 10 functions as the candidate point extracting means 20.

The normalizing means 30 shown in FIG. 1 normalizes coordinates of the candidate points $S_p$ extracted by the candidate point extracting means 20 based on predetermined reference positions $S_{ref}$. For example, if the predetermined structure is the coronary arteries, the normalizing means 30 detects the aortic valve, the mitral valve and the apex of the heart, as shown in FIG. 2, to set them as the reference positions $S_{ref}$. Then, the normalizing means 30 expresses the position of each candidate point $S_p$ in a new coordinate system, where the apex of the heart is the origin, an axis from the apex of the heart toward the aortic valve is a z-axis, an outer product of a vector from the apex of the heart toward the mitral valve and the z-axis is an x-axis, an outer product of the x-axis and the z-axis is a y-axis, and a length from the apex of the heart to the aortic valve is 1. Since the aortic valve, the mitral valve and the apex of the heart have small variation due to individual differences, using them as the reference positions $S_{ref}$ for the normalization can minimize variation of the candidate points $S_p$ due to individual differences.

Figure 4:
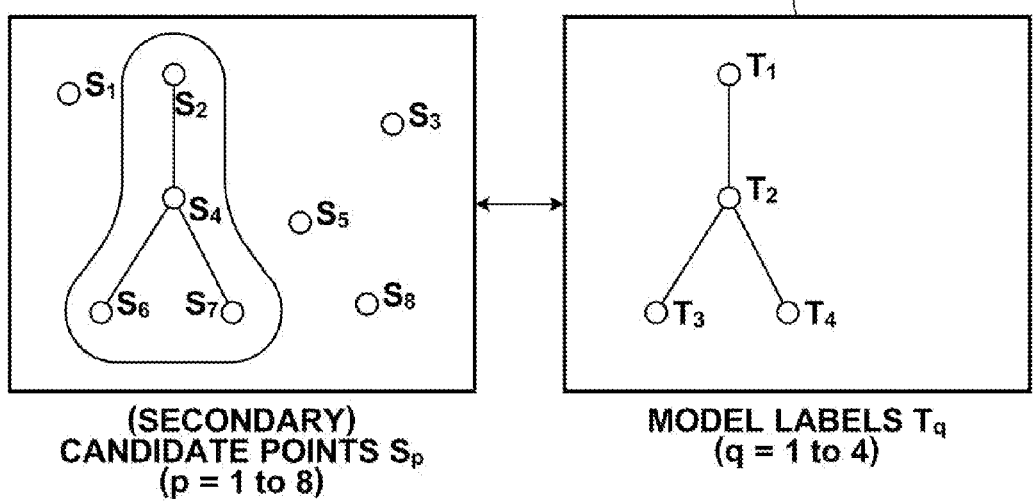
FIG. 4 is a schematic diagram illustrating how predetermined corresponding points are selected by a corresponding point selecting means.

The corresponding point selecting means 40 shown in FIG. 1 forms the graph structure $M_s$ by selecting, from the candidate points $S_p$ normalized by no/mall zing means 30, corresponding points forming the graph structure $M_s$ that matches or is most similar to a shape model $M_{ref}$ stored in a shape model storing means DB, and connecting the selected corresponding points such that the graph structure $M_s$ substantially matches the shape model $M_{ref}$. As shown in FIG. 4, for example, it is assumed that a plurality of candidate points $S_p$ (p=1 to 8) have been extracted by the candidate point extracting means 20, and the shape model $M_{ref}$ formed by four model labels $T_q$ (q=1 to 4) having a predetermined connection relationship has been stored in the shape model storing means DB. In this case, the corresponding point selecting means 40 selects the corresponding points forming a graph structure that matches or is most similar to the shape model $M_{ref}$ (i.e., the point $S_2$ for the label $T_1$, the point $S_4$ for the label $T_2$, the point $S_6$ for the label $T_3$, and the point $S_7$ for the label $T_4$) to form the graph structure $M_s$.

The corresponding point selecting means 40 selects the corresponding points by using graph matching, and the shape model storing means DB stores an energy function E for graph matching as the shape model $M_{ref}$. Then, the corresponding point selecting means 40 finds an optimal solution which achieves minimization of the energy function E from a set C' of candidate solutions that satisfy the constraint expressed by Equation (4) below:

$$C' = \left\{ x \in \{0,1\}^{P \times Q} \middle| \sum_{Sp \in P} xSpTq \le 1, \right.$$

$$\sum_{Tq \in Q} xSpTq + \sum_{(Sp', Sp'') \in P \times P | p' < p''} \left( \sum_{q \in Q} ySpSp'Sp'' \times xSp'Tq \times \sum_{q \in Q} xSp''Tq \right) \le $$

$$\left. 1, \forall Sp \in P \text{ and } \forall Tq \in Q \right\}.$$

where P represents a set of candidate points $S_p$, Q represents a set of model labels $T_q$, $x_{SpTq}$ ($x_{Sp'Tq}$, $x_{Sp''Tq}$) is a binary variable indicating a mapping relationship between an arbitrary candidate point $S_p$ ($S_{p'}$, $S_{p''}$) and an arbitrary model label $T_q$ and has a value of 1 if the candidate point is mapped with the model label or a value of 0 if the candidate point is not mapped with the model label, and x is a P×Q-dimensional vector with values of the variable $x_{SpTq}$ being the elements thereof.

In Equation (4), the constraints limiting the feasible solutions x are formed by two inequality expressions. The inequality expression on the left means that a sum of values of the variable $x_{SpTq}$ obtained between an arbitrary model label $T_q$ and each candidate point $S_p$ belonging to the set P is not more than 1. This means that each model label is mapped with only one of the candidate points or none of the candidate points.

The first term of the left side of the inequality expression on the right is a sum of values of the variable $x_{SpTq}$ obtained between an arbitrary candidate point $S_p$ and each model label $T_q$ belonging to the set Q, and has a value of 1 if the candidate point $S_p$ of interest is mapped with any of the model labels $T_q$, or has a value of 0 if the candidate point $S_p$ of interest is not mapped with any of the model labels $T_q$.

The second term of the left side of the inequality expression on the right includes $y_{SpSp'Sp''}$, $\Sigma x_{Sp'Tq}$ and $\Sigma x_{Sp''Tq}$. The variable $y_{SpSp'Sp''}$ is a binary variable. When a path between an arbitrary candidate point $S_{p'}$ and an arbitrary candidate point $S_{p''}$ is determined by selectively connecting candidate points which are mapped with none of the model labels to achieve a minimal cost based on a predetermined index value, the variable $y_{S_pS_{p'}S_{p''}}$ has a value of 1 if an arbitrary candidate point $S_p$ is selected to determine the path between the candidate points $S_{p'}$, and $S_{p''}$, or a value of 0 if the candidate point $S_p$ of interest is not selected. The variable $\Sigma x_{S_pT_q}$ is a sum of values of the variable $x_{S_{p'}T_q}$ obtained between the candidate point $S_{p'}$, and each model label $T_q$ belonging to the set Q, and has a value of 1 if the candidate point $S_{p'}$ is mapped with any of the model labels $T_q$, or a value of 0 if the candidate point $S_{p'}$ is not mapped with any of the model labels $T_q$. The variable $\Sigma x_{S_{p''}T_q}$ is a sum of values of the variable $X_{S_{p''}T_q}$ obtained between the candidate point $S_{p''}$ and each model label $T_q$ belonging to the set Q, and has a value of 1 if the candidate point $S_{p''}$ is mapped with any of the model labels $T_q$, or a value of 0 if the candidate point $S_{p''}$ is not mapped with any of the model labels $T_q$.

The inequality expression on the right requires that the total sum of the first term and the second term is not more than 1, that is, one of the first term and the second term is 1 and the other is 0, or both the first term and the second terra are 0. That is, when the first term has a value of 1, a solution where the second term has a value of 1 is excluded. This means that each candidate point $S_p$ is mapped with only one of the model labels $T_q$ or none of the model labels $T_q$, and that, when a path between two candidate points $S_{p'}$, and $S_{p''}$ which are mapped with the model labels is determined by selectively connecting the candidate points which are mapped with none the model labels to achieve a minimal cost based on a predetermined index value, each candidate point $S_p$ which is mapped with none of the model labels is included in only one of the determined paths or included in none of the determined paths.

The energy function E is expressed by Equation (5) below, which includes the vector x as a variable:

$$E(x|\theta) = \sum_{a \in R} \theta_a x_a + \sum_{(a,b) \in R \times R} \theta_{ab} x_a x_b, \quad (5)$$

where R represents a set of mappings between the candidate points and the model labels in the feasible solutions x, and $\theta_a$ is a cost of an arbitrary mapping a (between an arbitrary candidate point $S_{p'}$ and an arbitrary model label $T_{q'}$) belonging to the set R, which is expressed by Equation (6) below:

$$\theta_a = -L_{T_{q'}}(C_{S_{p'}}) \quad (6).$$

In Equation (6), $L_{T_{q'}}(C_{S_{p'}})$ represents a probability of the model label $T_{q'}$ being mapped with the candidate points $S_{p'}$, and the distribution thereof is approximated by a Gaussian function, which is expressed by Equation (7) below:

$$L_{T_q}(C_{S_{p'}}) = N(C_{S_{p'}}|\mu_{T_{q'}}, \sigma_{T_q}^2) \quad (7)$$

where $C_{S_{p'}}$ represents coordinates of the candidate point $S_{p'}$, and $\mu_{T_{q'}}$ and $\sigma_{T_q}^2$ are average coordinates and a variance, respectively, of the model label $T_{q'}$, which is obtained from a plurality of pieces of training data known to represent the predetermined structure M. The value of $L_{T_{q'}}(C_{S_{p'}})$ is smaller as a distance between the coordinates of the candidate point $S_{p'}$ and the coordinates of the model label $T_{q'}$ is larger, and vice versa.

Figure 5A:
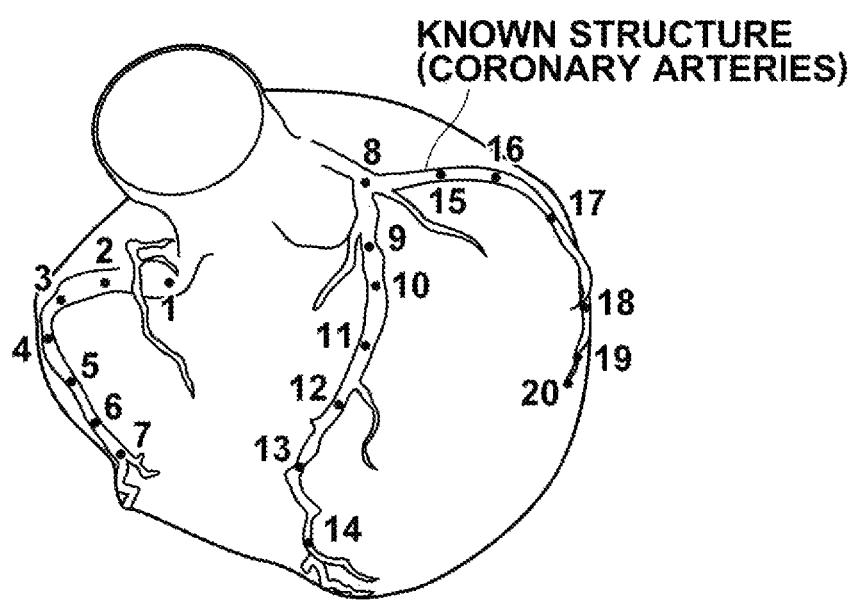
FIG. 5A is a schematic diagram illustrating one example of training data used for learning a set model.
Figure 5B:
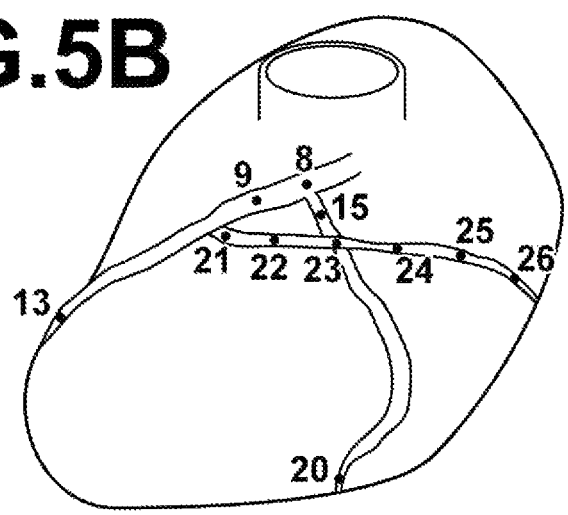
FIG. 5B is a schematic diagram illustrating one example of training data used for learning a set model.

It should be noted that the model labels $T_q$ (q=1 to 26, for example) are extracted in advance from training data, which is known to represent the predetermined structure M, as shown in FIGS. 5A and 5B. In FIGS. 5A and 5B, the model labels T1 to T20 are extracted from the coronary arteries, which are the predetermined structure M, and the model labels T21 to T26 are extracted from the coronary veins.

Then, as shown in FIG. 6, the shape model (graph) $M_{ref}$ is formed by connecting predetermined labels $T_{q'}$ among the model labels T1 to T26 by edges (lines). The extraction of the model labels $T_q$ is carried out for a plurality of pieces of training data. Then, for each model label $T_{q'}$ of each training data, average coordinates $\mu_{T_{q'}}$ and a variance $\sigma_{T_{q'}}^2$ are calculated, and a probability density function $L_{T_{q'}}(C_{S_{p'}})$ expressed by Equation (7) is derived for each model label $T_{q'}$.

On the other hand, $\theta_{ab}$ in Equation (5) is a cost of a combination of two mappings a and b belonging to the set R (a is a mapping between the candidate point $S_{p'}$ and the model label $T_{q'}$, and b is a mapping between the candidate point $S_{p''}$ and the model label $T_{q''}$), and is expressed by Equation (8) below:

$$\theta_{ab} = -L_{T_{q'}T_{q''}}(C_{S_{p'}}, C_{S_{p''}}) + \min \sum_{(S_i,S_j) \in Path(S_{p'},S_{p''})} e_{local}(S_i, S_j). \quad (8)$$

It should be noted that, in this embodiment, a sum of costs obtained by finding a path connecting each pair of $S_{p'}$ and $S_{p''}$ to achieve a minimal cost is used as the matching cost $\theta_{ab}$. However, a different evaluation value relating to the found paths may be used as the matching cost. For example, an evaluation value, such as an average or variance of luminance values of pixels located along the paths, an average or variance of values of the radius of the structure M at each position along the paths, or the entire length of the paths, may be used.

The variance $L_{T_{q'}T_{q''}}(C_{S_{p'}},C_{S_{p''}})$ represents a probability of an arbitrary pair of model labels $(T_{q'},T_{q''})$ being mapped with an arbitrary pair of candidate points $(S_{p'}, S_{p''})$, and is expressed by Equation (9) below:

$$L_{T_{q'}T_{q''}}(C_{S_{p'}},C_{S_{p''}}) = N(C_{S_{p'}}-C_{S_{p''}}|\mu_{T_{q'}T_{q''}},\sigma_{T_{q'}T_{q''}}^2) \quad (9),$$

where $(C_{S_{p'}}-C_{S_{p''}})$ is relative coordinates of the candidate point $S_{p''}$ relative to the coordinates of the candidate point $S_{p'}$, and $\mu_{T_{q'}T_{q''}}$ and $\sigma_{T_{q'}T_{q''}}^2$ are an average value and a variance, respectively, of relative coordinates of the model label $T_{q''}$ relative to the coordinates of the model label $T_{q'}$ obtained from a plurality of pieces of training data which are known to represent the predetermined structure M (see FIG. 7).

Further, $e_{local}$ in the second term of Equation (8) represents a cost of a connection between directly-connected two candidate points $S_i$, $S_j$, if any, which are located along a path connecting the candidate points $S_{p'}$ and $S_{p''}$ mapped with the model labels, may be defined such that $e_{local}$ has a smaller value as the distance between the two points $S_i$, $S_j$ is smaller, or the difference of the luminance value between the two points $S_i$, $S_j$ is smaller, or the difference of the width of the blood vessel between the two points $S_i$, $S_j$ is smaller, for example. $\Sigma e_{local}$ is a sum of values of the $e_{local}$ obtained for all the pairs of directly-connected two candidate points along the path between the candidate points $S_{p'}$ and $S_{p''}$, and $\min \Sigma e_{local}$ is found by calculating an optimal path between the candidate points $S_{p'}$ and $S_{p''}$ using, for example, an Dijkstrar's algorithm with handling the candidate points as a graph structure where each side (edge) connecting the candidate points is weighted with a weight defined by the $e_{local}$.

Further, the corresponding point selecting means 40 stores paths connecting the candidate points between the candidate points $S_{p'}$ and $S_{p''}$ which achieve a minimal value of $\Sigma e_{local}$ in a predetermined memory area of the structure detection device 1. With this, an optimal path that smoothly connects the candidate points $S_{p'}$ and $S_{p''}$ via other candidate points is determined from paths connecting various candidate points between the candidate points $S_{p'}$ and $S_{p''}$.

The corresponding point selecting means 40 solves (i.e., finds an optimal solution of) the above-described minimization problem of the constrained energy function E using a Dual Decomposition (DD) method. The DD method divides a main problem to be solved into sub-problems that are calculable. The main problem becomes a convex combination if the condition expressed by Equation (10) below is satisfied:

$$\sum_{\sigma \in I} \rho_\sigma \theta^\sigma = \theta, \tag{10}$$

where θ is a vector representing the energy function of the main problem, each sub-problem is represented by a vector $\theta^\sigma$ (σ∈I), $\rho_\sigma$ is a weighting factor having a positive value, and I is an index of the sub-problem.

A lower bound function Φ(θ), which is defined based on the sub-problems, is a convex function expressed by Equation (11) below:

$$\Phi(\theta) = \Sigma_{\sigma \in I} \rho_\sigma \min E(x|\theta^\sigma) \tag{11},$$

and can therefore be maximized by a projected subgradient method. There is a relationship that a lower bound value is not larger than a solution (upper bound value) of the main problem, and therefore the minimal solution of the main problem is obtained when the lower bound value is the same value as the upper bound value.

The division into the sub-problems is achieved as follows. For each node, one sub-problem that takes only the node and an adjacent node connected to the node by an edge into account is generated. Each sub-problem ignores the costs $\theta_a$ and $\theta_{ab}$ of the other nodes (i.e., considers the costs as "0"). When the sub-problem is small enough, the solution thereof can be calculated by searching through all the combinations. If a branch-and-bound method is used, the solution can be obtained more rapidly. In the case where the branch-and-bound method is used, first, a relaxed lower bound is set. In this embodiment, the relaxed lower bound is defined as a minimal cost which may possibly be achieved by a certain node without a uniqueness constraint. By omitting detailed calculation of combinations which are not likely to improve the solution with referencing the relaxed lower bound, the amount of calculation can significantly be reduced.

Alternatively, the corresponding point selecting means 40 may solve the minimization problem of the energy function E by using a loopy belief propagation method. Further, although the energy function E is minimized in Equation (5), the first variable term and the second variable term may be multiplied with a negative value, and the evaluation value of the energy function E may be maximized.

The structure detecting means 50 shown in FIG. 1 detects the structure M based on the corresponding points selected by the corresponding point selecting means 40 and the optimal paths between the corresponding points determined in advance. It should be noted that the optimal paths have already been calculated and stored in a predetermined memory area of the structure detection device 1 when the corresponding point selecting means 40 calculates the min-$\Sigma e_{local}$.

In a case where the shape model $M_{ref}$ does not represent the entire structure M to be detected, the structure detecting means 50 detects the entire structure M by using a minimal spanning tree algorithm to connect candidate points which are not used in the optimal path between the corresponding points. At this time, when a distance between the candidate points are larger than a predetermined value, the candidate points are not connected, and a group of candidate points which is eventually not connected to any part of, the detected structure M detected based on the shape model $M_{ref}$ is handled as not belonging to the structure M. In contrast, in a case where the shape model $M_{ref}$ represents the entire structure M to be detected, it is not necessary to the connect candidate points which are not used in the optimal path between the corresponding points, since they are remaining regions (such as pulmonary vessels or the heart muscle) that do not belong to the structure M to be detected.

FIG. 8 is a flow chart illustrating the flow of a process to detect a structure by the structure detection device. As shown in FIG. 8, first, the candidate region detecting means 10 detects the candidate region $R_c$ from the image data DV (step ST1, see FIG. 2). Then, the candidate point extracting means 20 extracts the (primary) candidate points $S_{p0}$ from the candidate region $R_c$, and extracts the (secondary) candidate points $S_p$ by segmentation (step ST2, see FIG. 3). Thereafter, the normalizing means 30 performs normalization, and the corresponding point selecting means 40 selects, from the candidate points $S_p$, the set of corresponding points forming the graph structure $M_s$ that is most similar to the shape model $M_{ref}$, according to Equation (5) (step ST3, see FIG. 4). Then, the structure detecting means 50 detects the structure M based on the optimal paths connecting the selected corresponding points via other candidate points (step ST4).

Figure 11A:
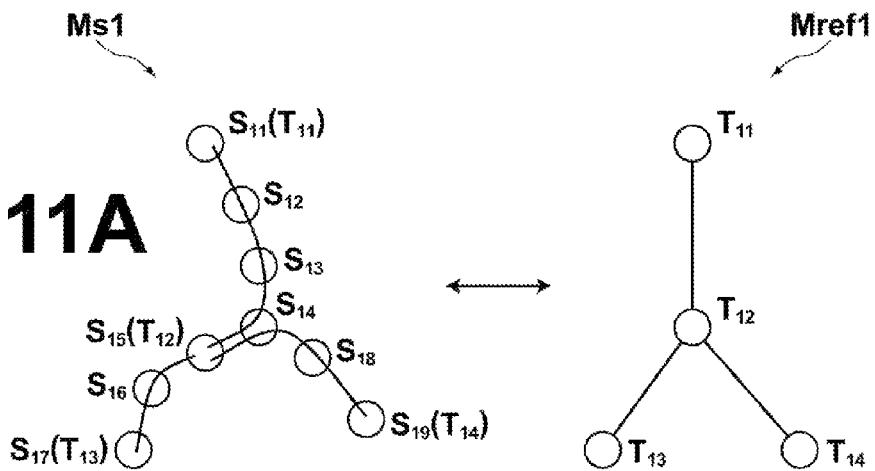
FIG. 11A is a schematic diagram illustrating one example of a graph structure formed by a conventional method.
Figure 11B:
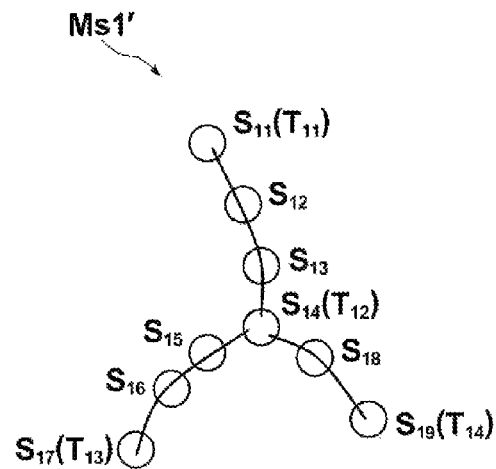
FIG. 11B is a schematic diagram illustrating a properly formed graph structure for the graph structure shown in FIG. 11A.
Figure 12A:
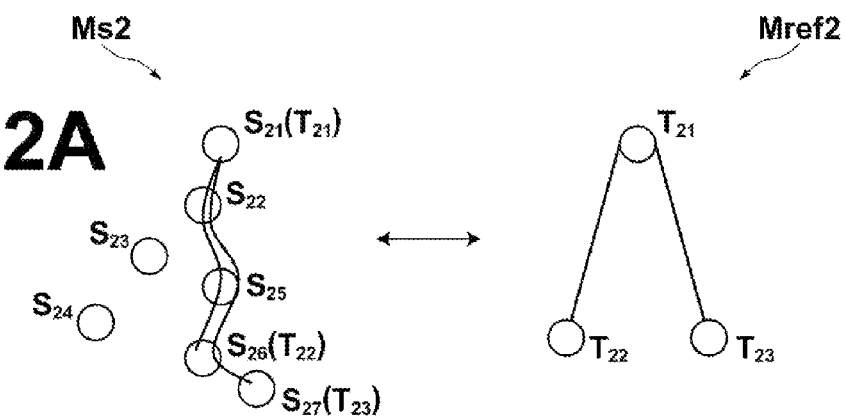
FIG. 12A is a schematic diagram illustrating one example of a graph structure formed by a conventional method.
Figure 12B:
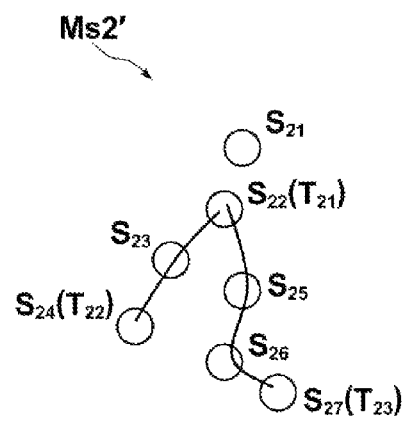
FIG. 12B is a schematic diagram illustrating a properly formed graph structure for the graph structure shown in FIG. 12A.

As described above, according to the structure detection device, method and program of this embodiment, the candidate points belong to the predetermined structure M are extracted from the image data DV. From the extracted candidate points, the corresponding points forming the graph structure $M_s$ that matches or is most similar to the shape model $M_{ref}$, which is formed by the model labels $T_q$ having a predetermined connection relationship, represents a known shape of the structure M and is stored in advance in the shape model storing means DB, are selected under the following constraints (a) to (c): (a) each model label is mapped with only one of the candidate points or none of the candidate points; (b) each candidate point is mapped with only one of the model labels or none of the model labels; and (c) when a path between two candidate points which are mapped with each pair of the model labels connected with each other is determined, each candidate point which is mapped with none of the model labels is included in only one of the determined paths or none of the determined paths. Then, the structure M is detected from the image data DV using the selected corresponding points. This allows accurate detection of the structure M from the image data DV. In particular, the constraint (c) serves to exclude a mapping between the candidate points and the model labels which has overlapped paths connecting the corresponding points, such as the graph structure $M_s1$ shown in FIG. 11A or the graph structure $M_s2$ shown in FIG. 12A, thereby improving the accuracy of the detection of the structure M compared to the conventional method disclosed in Patent Document 1, or the like.

Further, in a case where the corresponding point selecting means 40 selects the corresponding points under the constraint where an arbitrary candidate point $S_p$ belonging to set P and an arbitrary model label $T_q$ belonging to the set Q satisfy Equation (4) above, a mapping between the candidate point and the model label with overlapped paths connecting the corresponding points can be excluded, thereby allowing accurate detection of the structure M from the image data DV.

Although the above-described embodiment is the case where the image processing device, method and program of the invention are applied to detection of the coronary arteries from the image data DV, the image processing device, method and program of the invention are also applicable to extraction of the trachea, the intestines, the cerebral vessels, the pulmonary vessels, the hepatic vessels or the bronchial tubes, for example. In this case, a shape model corresponding to the structure M, such as the cerebral vessels, is stored in the shape model storing means DB, and the corresponding points are selected using a designed shape depending on the type of the structure M.

Figure 9A:
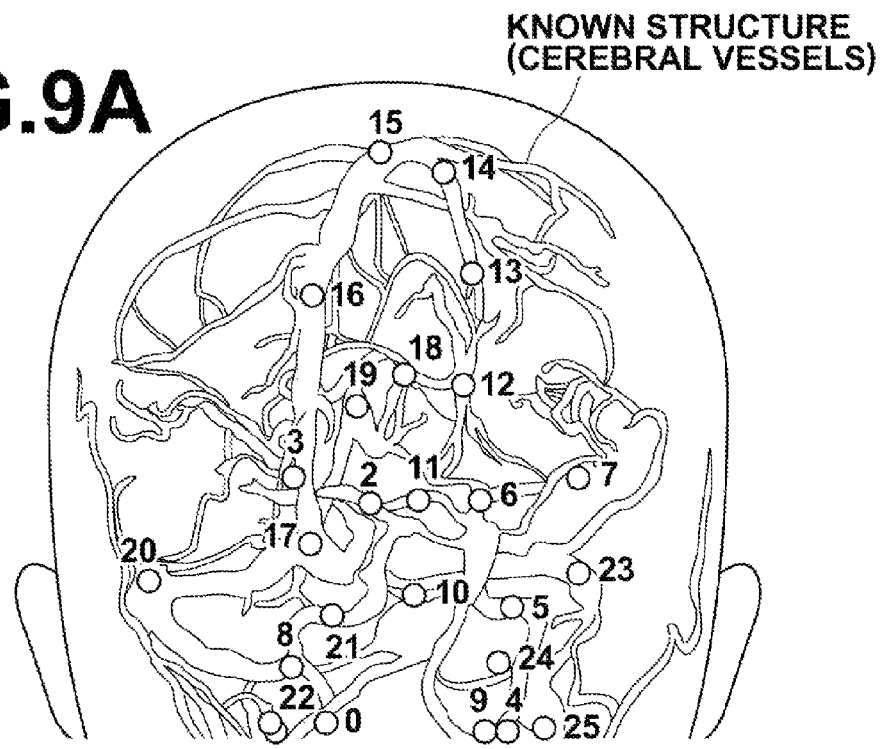
FIG. 9A is a schematic diagram illustrating one example of training data used for learning a set model.
Figure 9B:
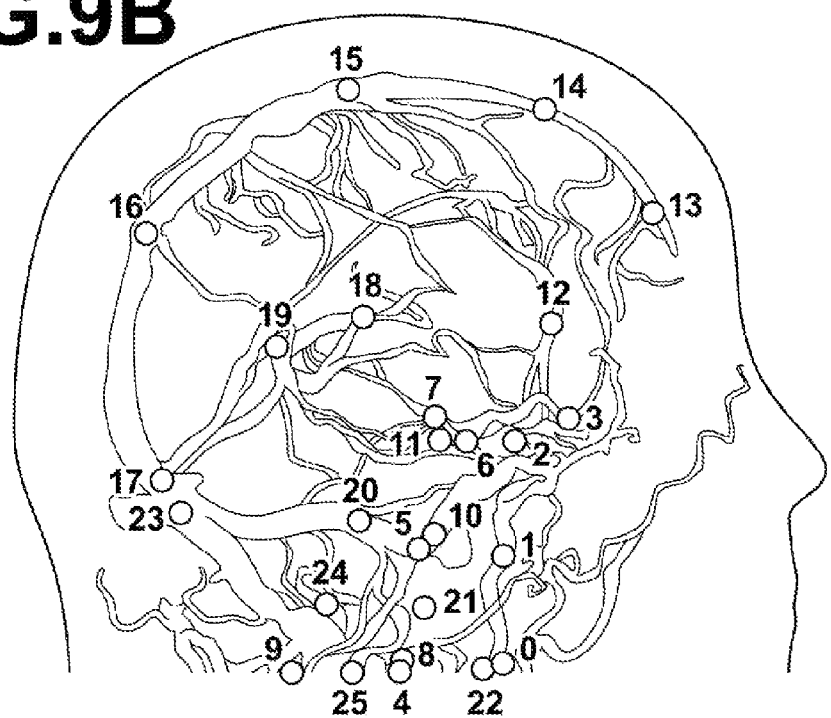
FIG. 9B is a schematic diagram illustrating one example of training data used for learning a set model.

For example, in a case where the structure M is the cerebral vessels, the model labels $T_q$ (q=1 to 25, for example) are extracted from training data that is known to represent the cerebral vessels, as shown in FIGS. 9A and 9B. In FIGS. 9A and 9B, the model labels $T_1$ to $T_{12}$ are extracted from the arteries, which are the predetermined structure M, and the model label $T_{13}$ to $T_{25}$ are extracted from the veins. Then, as shown in FIG. 10, the shape model (graph) $M_{ref}$ is formed by connecting predetermined labels among the model labels T1 to T25 by edges (lines).

The image processing device, method and program of the invention are also applicable to a case where graph structures which are extracted from a plurality of images taken by imaging the same patient at different phases are mapped with each other. In this case, one of the graph structures extracted from one of phases may be used as the shape model, and nodes forming the graph structure may be used as the model labels.

Although the above-described embodiment includes the normalizing means 30 and the structure detecting means 50, the normalizing means 30 and the structure detecting means 50 are optional.

In a case where a predetermined structure M including different sub-structures (arteries and veins, for example) is used as the shape model $M_{ref}$, the structure detection device 1 may further include a display control means for displaying the different sub-structures in different colors.

In a case where the predetermined structure is blood vessels, the corresponding point selecting means 40 may select the corresponding points by using coordinates of the candidate points and radii or luminance values of the blood vessels at the candidate points.

What is claimed is:

1. An image processing device comprising:
a candidate point extracting unit configured to extract a plurality of candidate points belonging to a predetermined structure from image data;
a shape model storing unit configured to store a shape model representing a known shape of the predetermined structure, the shape model being formed by a plurality of model labels having a predetermined connection relationship; and
a corresponding point selecting unit configured to select a mapping relationship between the candidate points and the model labels from a set of candidate mapping relationships satisfying constraints (a) to (c) below:
(a) each model label is mapped with only one of the candidate points or none of the candidate points;
(b) each candidate point is mapped with only one of the model labels or none of the model labels; and
(c) when a path between two candidate points which are mapped with each pair of the model labels connected with each other is determined, each candidate point which is mapped with none of the model labels is included in only one of the determined paths or none of the determined paths,
wherein the shape model forms a branch structure and includes a first model label as a branch point, and edges connecting the first model label to second, third and fourth model labels, respectively $$E(x|\theta) = \sum_{a \in R} \theta_a x_a + \sum_{(a,b) \in R \times R} \theta_{ab} x_a x_b.$$

2. The image processing device as claimed in claim 1, wherein the corresponding point selecting unit selects a mapping relationship in which there is a possibility that each of all the candidate points are mapped with one of all of the model labels.

3. The image processing device as claimed in claim 1, wherein the corresponding point selecting unit selects a mapping relationship by determining two or more different paths, each path being between two candidate points which are mapped with one of all of the pairs of the model labels connected with each other and satisfying constraint (c).

4. The image processing device as claimed in claim 1, wherein the corresponding point selecting unit selects a mapping relationship by minimizing an energy function E expressed by Equation (2) below including the vector x as a variable using a Dual Decomposition method:

$$E(x|\theta) = \sum_{a \in R} \theta_a x_a + \sum_{(a,b) \in R \times R} \theta_{ab} x_a x_b, \tag{2}$$

where a and b represent individual mappings between the candidate points and the model labels in the mapping relationship represented by the vector x, b represents a different mapping from a mapping represented by a, a and b are elements belonging to a set R and the set R is a subset of P×Q, $\theta_a$ represents a cost of a mapping a∈R, and $\theta_{ab}$ represents a cost of (a,b)∈R×R, which is a combination of the mappings a and b.

5. The image processing device as claimed in claim 1, further comprising a structure detecting unit configured to detect the predetermined structure from the image data based on the mapping relationship selected by the corresponding point selecting unit and the determined paths in the mapping relationship.

6. The image processing device as claimed in claim 1, wherein the corresponding point selecting unit determines the paths by selectively connecting the candidate points to achieve a minimal cost based on a predetermined index value.

7. The image processing device as claimed in claim 1, further comprising:
a normalizing unit which normalizes coordinates of the plurality of candidate points extracted by the candidate point extracting unit based on predetermined reference positions.

8. The image processing device as claimed in claim 7, wherein the normalizing unit expresses a position of each candidate point of the plurality of candidate points in a new coordinate system.

9. The image processing device as claimed in claim 8, wherein the corresponding point selecting unit forms a graph structure by:
selecting, from the plurality of candidate points normalized by normalizing means unit, corresponding points forming the graph structure that matches or is most similar to a shape model stored in the shape model storing unit; and
connecting the selected corresponding points such that the graph structure substantially matches the shape model.

10. An image processing method comprising:
extracting a plurality of candidate points belonging to a predetermined structure from image data;
obtaining a shape model stored in advance in a shape model storing unit, the shape model representing a known shape of the predetermined structure and being formed by a plurality of model labels having a predetermined connection relationship; and
selecting a mapping relationship between the candidate points and the model labels from a set of candidate mapping relationships satisfying constraints (a) to (c) below:
(a) each model label is mapped with only one of the candidate points or none of the candidate points;
(b) each candidate point is mapped with only one of the model labels or none of the model labels; and
(c) when a path between two candidate points which are mapped with each pair of the model labels connected with each other is determined, each candidate point which is mapped with none of the model labels is included in only one of the determined paths or none of the determined paths,
wherein the shape model forms a branch structure and includes a first model label as a branch point, and edges connecting the first model label to second, third and fourth model labels, respectively $$E(x \mid \theta) = \sum_{a \in R} \theta_a x_a + \sum_{(a,b) \in R \times R} \theta_{ab} x_a x_b.$$

11. The image processing method as claimed in claim 10, wherein the selection of the mapping relationship comprises selecting a mapping relationship in which there is a possibility that each of all the candidate points are mapped with one of all of the model labels.

12. The image processing method as claimed in claim 10, wherein the selection of the mapping relationship comprises selecting a mapping relationship by determining two or more different paths, each path being between two candidate points which are mapped with one of all the pairs of the model labels connected with each other and satisfying constraint (c).

13. The image processing method as claimed in claim 10, wherein the selecting of the mapping relationship comprises selecting the mapping relationship by minimizing an energy function E expressed by Equation (2) below including the vector x as a variable using a Dual Decomposition method:

$$E(x \mid \theta) = \sum_{a \in R} \theta_a x_a + \sum_{(a,b) \in R \times R} \theta_{ab} x_a x_b, \qquad (2)$$

where a and b represent individual mappings between the candidate points and the model labels in the mapping relationship represented by the vector x, b represents a different mapping from a mapping represented by a, a and b are elements belonging to a set R and the set R is a subset of P×Q, $\theta_a$ represents a cost of a mapping a∈R, and $\theta_{ab}$ represents a cost of (a,b)∈R×R, which is a combination of the mappings a and b.

14. A non-transitory computer readable medium containing an image processing program for causing a computer to carry out the steps of:
extracting a plurality of candidate points belonging to a predetermined structure from image data;
obtaining a shape model stored in advance in a shape model storing unit, the shape model representing a known shape of the predetermined structure and being formed by a plurality of model labels having a predetermined connection relationship; and
selecting a mapping relationship between the candidate points and the model labels from a set of candidate mapping relationships satisfying constraints (a) to (c) below:
(a) each model label is mapped with only one of the candidate points or none of the candidate points;
(b) each candidate point is mapped with only one of the model labels or none of the model labels; and
(c) when a path between two candidate points which are mapped with each pair of the model labels connected with each other is determined, each candidate point which is mapped with none of the model labels is included in only one of the determined paths or none of the determined paths,
wherein the shape model forms a branch structure and includes a first model label as a branch point, and edges connecting the first model label to second, third and fourth model labels, respectively $$E(x \mid \theta) = \sum_{a \in R} \theta_a x_a + \sum_{(a,b) \in R \times R} \theta_{ab} x_a x_b.$$

15. The non-transitory computer readable medium as claimed in claim 14, wherein the selection of the mapping relationship comprises selecting a mapping relationship in which there is a possibility that each of all the candidate points are mapped with one of all of the model labels.

16. The non-transitory computer readable medium as claimed in claim 14, wherein the selection of the mapping relationship comprises selecting a mapping relationship by determining two or more different paths, each path being between two candidate points which are mapped with one of all the pairs of the model labels connected with each other and satisfying constraint (c).

17. The non-transitory computer readable medium as claimed in claim 14, wherein the selection of the mapping relationship comprises selecting a mapping relationship by minimizing an energy function E expressed by Equation (2) below including the vector x as a variable using a Dual Decomposition method:

$$E(x \mid \theta) = \sum_{a \in R} \theta_a x_a + \sum_{(a,b) \in R \times R} \theta_{ab} x_a x_b, \qquad (2)$$

where a and b represent individual mappings between the candidate points and the model labels in the mapping relationship represented by the vector x, b represents a different mapping from a mapping represented by a, a and b are elements belonging to a set R and the set R is a subset of P×Q, $\theta_a$ represents a cost of a mapping a∈R, and $\theta_{ab}$ represents a cost of (a,b)∈R×R, which is a combination of the mappings a and b.

* * * * *